US012069460B2

(12) United States Patent
Huo et al.

(10) Patent No.: US 12,069,460 B2
(45) Date of Patent: Aug. 20, 2024

(54) VIBRATION DIAPHRAGM, VIBRATION ASSEMBLY, SOUND GENERATOR AND SOUND GENERATOR MODULE

(71) Applicant: GOERTEK INC., Shandong (CN)

(72) Inventors: Xinxiang Huo, Shandong (CN); Dan Han, Shandong (CN)

(73) Assignee: Goertek Inc., Shandong (CN)

( * ) Notice: Subject to any disclaimer, the term of this patent is extended or adjusted under 35 U.S.C. 154(b) by 906 days.

(21) Appl. No.: 17/054,931

(22) PCT Filed: Dec. 21, 2018

(86) PCT No.: PCT/CN2018/122700
§ 371 (c)(1),
(2) Date: Nov. 12, 2020

(87) PCT Pub. No.: WO2019/218675
PCT Pub. Date: Nov. 21, 2019

(65) Prior Publication Data

US 2021/0235195 A1 Jul. 29, 2021

(30) Foreign Application Priority Data

May 15, 2018 (CN) ........................ 201810462369.2

(51) Int. Cl.
*H04R 9/04* (2006.01)
*H04R 7/14* (2006.01)
*H04R 9/06* (2006.01)

(52) U.S. Cl.
CPC ................ *H04R 9/04* (2013.01); *H04R 7/14* (2013.01); *H04R 9/06* (2013.01); *H04R 2400/11* (2013.01); *H04R 2420/07* (2013.01)

(58) Field of Classification Search
CPC ... H04R 9/04; H04R 7/14; H04R 9/06; H04R 2400/11; H04R 2420/07
(Continued)

(56) References Cited

U.S. PATENT DOCUMENTS 6,243,472 B1 * 6/2001 Bilan ...................... H04R 1/06 381/407
2010/0264871 A1 * 10/2010 Matouka .............. H02J 7/0042 320/108
(Continued)

FOREIGN PATENT DOCUMENTS

CN 104822112 A 8/2015
CN 204616080 U 9/2015
(Continued)

*Primary Examiner* — Vivian C Chin
*Assistant Examiner* — Douglas J Suthers
(74) *Attorney, Agent, or Firm* — Baker Botts LLP

(57) ABSTRACT

Provided is a vibration diaphragm, comprising a wireless transmission unit which is arranged on one side of the vibration diaphragm where a voice coil can be fixed, and is used for electrically connecting with the voice coil, wirelessly receiving an audio signal transmitted from an external terminal and processing the audio signal to obtain audio current, and inputting the audio current into the voice coil; and a wireless charging unit which is electrically connected with the wireless transmission unit, generating electric energy under an action of an external power supply module and inputting the electric energy into the wireless transmission unit. Also provided are a vibration assembly, a sound generator and a sound generator module. With integration of the receiving and processing of audio signal on the vibration diaphragm, long-distance routing of a voice coil lead of the voice coil is avoided, noise is reduced, and product quality is improved.

8 Claims, 1 Drawing Sheet

(58) Field of Classification Search
USPC .......................................................... 381/117
See application file for complete search history.

(56) References Cited

U.S. PATENT DOCUMENTS

| | | | | |
|---|---|---|---|---|
| 2014/0241555 | A1* | 8/2014 | Terlizzi ................ | H04B 5/0006 320/108 |
| 2018/0124499 | A1 | 5/2018 | Li et al. | |
| 2018/0255400 | A1 | 9/2018 | Zheng et al. | |

FOREIGN PATENT DOCUMENTS

| | | | |
|---|---|---|---|
| CN | 204733351 | U | 10/2015 |
| CN | 204929249 | U | 12/2015 |
| CN | 108566603 | A | 9/2018 |

* cited by examiner

VIBRATION DIAPHRAGM, VIBRATION ASSEMBLY, SOUND GENERATOR AND SOUND GENERATOR MODULE

CROSS-REFERENCE TO RELATED APPLICATIONS

This application is a National Stage of International Application No. PCT/CN2018/122700, filed on Dec. 21, 2018, which claims priority to Chinese Patent Application No. 201810462369.2, filed on May 15, 2018, both of which are hereby incorporated by reference in their entireties.

TECHNICAL FIELD

The present disclosure relates to the field of acoustoelectric technology, and particularly relates to a vibration diaphragm, a vibration assembly, a sound generator and a sound generator module.

BACKGROUND

A sound generator is a device capable of converting electrical energy into sound energy; it belongs to the most basic sound generating unit, and is widely used in an end device such as a mobile phone. A sound generator includes a shell with a receiving space formed therein, as well as a vibration system and a magnetic circuit system received in the shell. The vibration system includes a vibration diaphragm and a voice coil. The voice coil is electrically connected with both a positive pole and a negative pole of an external control circuit via two voice coil leads, to form a loop. The external control circuit inputs electrical energy into the voice coil via the voice coil leads and the voice coil vibrates under an ampere force of a magnetic circuit system. The voice coil vibrates and drives the vibration diaphragm to vibrate to produce sound, thereby converting electric energy into sound energy, and realizing sound production function of the sound generator.

In a conventional sound generator, in order to exchange electrical signals with an external circuit, a voice coil lead is typically welded to a pad on a shell of the sound generator. As a result, the voice coil lead usually has long-distance routing, and defects would occur when the voice coil vibrates, such as the voice coil lead being prone to breakage or polarization, or the like. As such, it becomes even more difficult to make an internal structural design for a housing of a conventional sound generator, as it not only needs to provide space for the voice coil lead, but also to avoid collision noise caused by the voice coil lead.

SUMMARY

In order to solve at least one of the above problems, an object of the present invention is to provide a vibration diaphragm, which avoids long-distance routing of a voice coil lead of the voice coil by integrating the receiving and processing of audio signal on the vibration diaphragm, in order to reduce noise and improve product quality. Another object of the present invention is to provide a vibration assembly. Another object of the present invention is to provide a sound generator. Another object of the present invention is to provide a sound generator module.

To achieve the above objects, the present invention adopts the following technical solutions:

According to an object of the present invention, a vibration diaphragm is disclosed, comprising:

a wireless transmission unit which is arranged on a side of the vibration diaphragm where a voice coil may be fixed, and is used for electrically connecting with the voice coil, wirelessly receiving an audio signal transmitted from an external terminal and processing the audio signal to obtain audio current, and inputting the audio current into the voice coil; and a wireless charging unit which is electrically connected with the wireless transmission unit, generating electric energy under an action of an external power supply module and inputting the electric energy into the wireless transmission unit.

Preferably, the wireless transmission unit comprises a wireless receiving module and a signal processing module;

the wireless receiving module is capable of being wirelessly connected with the external terminal, receiving the audio signal transmitted from the external terminal and transmitting the audio signal to the signal processing module; and the signal processing module is used to receive the audio signal, convert the audio signal into the audio current and input the audio current into the voice coil.

Preferably, an operation frequency of the wireless charging unit is 100 KHz~300 KHz, and a frequency of the audio signal is 10 Hz~10 KHz.

Preferably, the side of the vibration diaphragm where the voice coil may be fixed is provided with a printed circuit board, and the signal processing module is provided on the printed circuit board.

Preferably, the printed circuit board is provided with two pads electrically connected to the signal processing module, and the voice coil comprises two voice coil leads, and the two pads are capable of being welded to the two voice coil leads of the voice coil, respectively.

Preferably, the vibration diaphragm comprises a vibration diaphragm central portion, a corrugated rim portion outside the vibration diaphragm central portion, and a connection portion outside the corrugated rim portion; wherein, the printed circuit board is fixed on a side surface of the vibration diaphragm central portion close to the voice coil; or a vibration diaphragm reinforcing portion is further fixed on a side surface of the vibration diaphragm central portion close to the voice coil, and the printed circuit board is fixed on the vibration diaphragm reinforcing portion; or the printed circuit board is fixed on a side surface of the vibration diaphragm central portion close to the voice coil, and a vibration diaphragm reinforcing portion is further fixed on the side surface of the vibration diaphragm central portion facing away from the voice coil.

Preferably, the wireless charging unit comprises a first coil connected to the wireless transmission unit;

the first coil generates electric energy under an action of a varying magnetic field generated by the external power supply module and transmits the electric energy to the wireless transmission unit; and the first coil is provided on the vibration diaphragm, the printed circuit board, or the voice coil fixed to the vibration diaphragm.

According to another object of the present invention, a vibration assembly is disclosed, comprising the above-mentioned vibration diaphragm and a voice coil fixed to the vibration diaphragm.

According to another object of the present invention, a sound generator is disclosed, comprising a sound generator shell and the above-mentioned vibration assembly received in the sound generator shell.

Preferably, the sound generator shell comprises a housing and a front cover;

a second coil electrically connected to an external power supply is fixed on an inner surface of the front cover corresponding to the vibration diaphragm; and the external power supply module comprises the second coil and the external power supply, the second coil generates a varying magnetic field under an action of the external power supply, and the first coil generates electrical energy under an action of the varying magnetic field.

According to another object of the present invention, a sound generator module is disclosed, comprising a module housing and the above-mentioned sound generator fixed in the module housing.

Preferably, a third coil electrically connected to an external power supply is fixed in the module housing; and the external power supply module comprises the third coil and the external power supply, the third coil generates a varying magnetic field under an action of the external power supply, and the first coil generates electric energy under an action of the varying magnetic field.

Advantages of the Present Invention are as Follows

The vibration diaphragm of the present invention is provided with a wireless transmission unit and a wireless charging unit that provides electric energy for the wireless transmission unit. The wireless transmission unit may wirelessly receive and process the audio signal to produce audio current, and input the audio current into voice coil such that the voice coil vibrates under the magnetic field of a magnetic circuit system, and then drives the vibration diaphragm to vibrate and produce sound. The wireless charging unit may generate electric energy under the action of the external power supply module to ensure the normal operation of the wireless transmission unit. Both the wireless charging unit and the wireless transmission unit are provided wirelessly to reduce the number of wiring in the sound generator. The voice coil is electrically connected directly to the wireless transmission unit provided on the vibration diaphragm. The voice coil leads do not need to be welded to pads on the shell through the wiring, thereby reducing the length of the voice coil leads. Accordingly, there is no need to route the voice coil leads through a corrugated rim portion of the vibration diaphragm, thereby preventing the voice coil leads from collision with the vibration diaphragm when the vibration diaphragm is vibrating. As a result, noise can be reduced, sound quality of the sound generator can be ensured, and space can be saved. Meanwhile, the voice coil leads are less prone to breakage, thereby ensuring improved product quality and lengthened service life.

BRIEF DESCRIPTION OF THE DRAWINGS

The specific implementations of the present invention are described below in further detail with reference to the accompanying drawings.

REFERENCE NUMERALS

1—vibration diaphragm, 2—voice coil, 3—voice coil lead, 4—printed circuit board, 5—pad, 6—first wire, 7—first coil, 8—chip, 9—second wire.

DETAILED DESCRIPTION

To explain the present invention more clearly, the present invention is further described below with reference to preferred embodiments and the accompanying drawings. Similar components are denoted with same reference numbers in the figures. Those skilled in the art should understand that content specifically described below is illustrative rather than restrictive, and should not limit the protection scope of the present invention.

The voice coil lead of the traditional sound generator has a long path along wire and occupies a large space in the housing. As such, the voice coil lead is prone to collide with the housing and produce collision noise. The voice coil lead vibrates along with the voice coil, and is prone to breakage or polarization. In order to solve at least one of these problems, the present invention provides a vibration diaphragm which has an improved structure, by which the voice coil lead fixed to the vibration diaphragm may effectively prevent breakage and polarization problems caused by the wiring. With the optimized structural design of the sound generating product, the reliability and stability of the sound generating product are improved.

Figure 1:
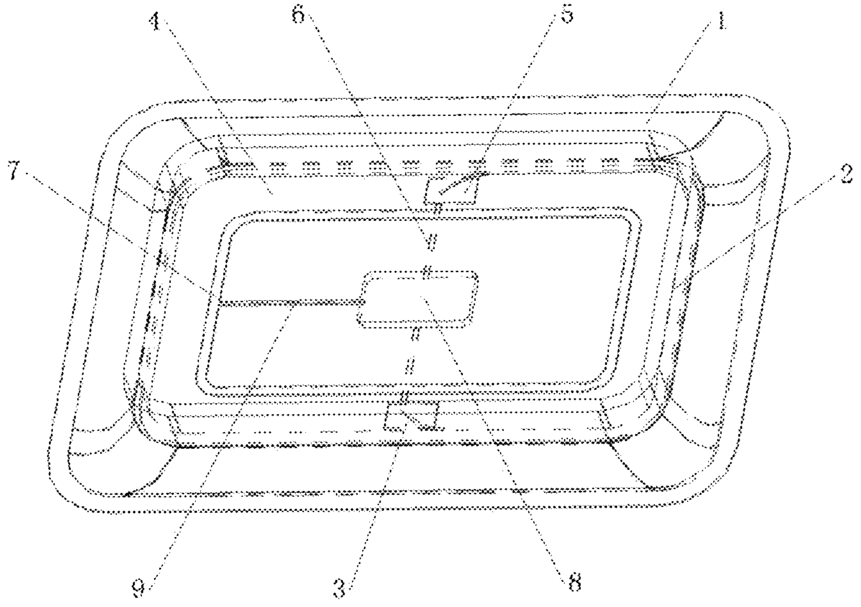
FIG. 1 shows a schematic diagram of a vibration diaphragm in a specific embodiment of the present invention.
Figure 2:
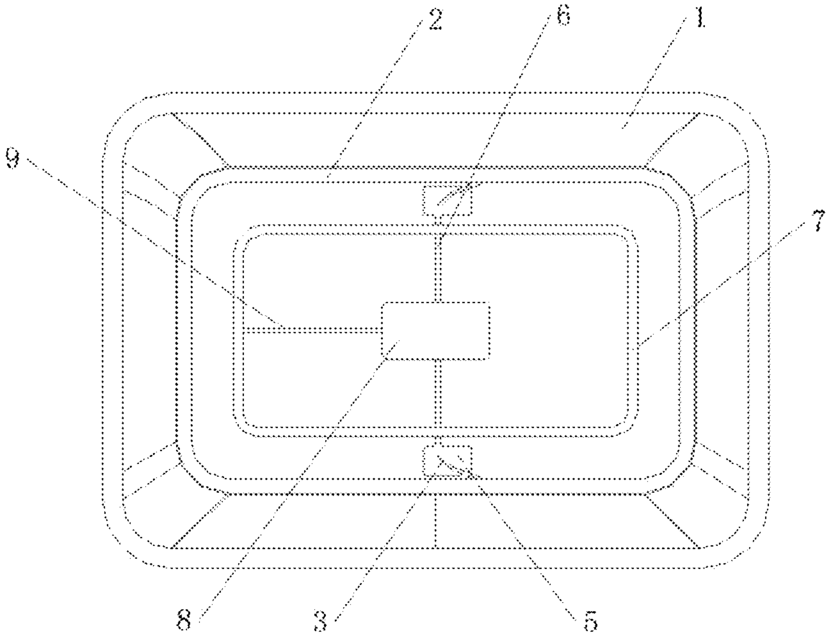
FIG. 2 shows a top view of a vibration diaphragm in a specific embodiment of the present invention.

FIGS. 1 and 2 show schematic diagrams of a vibration diaphragm 1 according to a specific embodiment of the present invention. As shown in FIGS. 1 and 2, in this embodiment, the vibration diaphragm 1 includes a wireless transmission unit and a wireless charging unit electrically connected to the wireless transmission unit.

In this embodiment, a square vibration diaphragm 1 is taken as an example for description. In the practical application, the vibration diaphragm 1 may also have other shapes such as a round shape, which is not limited herein.

The wireless transmission unit is arranged on one side of the vibration diaphragm 1 where the voice coil 2 may be fixed, and may wirelessly receive and process the audio signal to obtain the audio current and input the audio current into the voice coil 2 fixed to the vibration diaphragm 1, such that the voice coil 2 is supplied with the audio current. One end of the voice coil 2 away from the vibration diaphragm 1 may be further placed in a magnetic gap formed by components of a magnetic circuit. The voice coil 2 vibrates under an ampere force due to the action of the magnetic field of the magnetic gap, and then drives the vibration diaphragm 1 to vibrate and produce sound.

In order to ensure that the wireless transmission unit can receive and process audio signal, it is necessary to supply power to the wireless transmission unit. The wireless charging unit provided on the vibration diaphragm 1 may wirelessly generate electric energy under the action of an external power supply module and input the electric energy into the wireless transmission unit, thus providing electric energy for the wireless transmission unit so that the wireless transmission unit may convert the audio signal into audio current.

In a preferred embodiment, the wireless transmission unit may include a wireless receiving module and a signal processing module, wherein the wireless receiving module may be wirelessly connected with an external audio transmission terminal, receive audio signal transmitted from the audio transmission terminal, and transmit the audio signal to the signal processing module. Preferably, the wireless receiving module may be a Bluetooth module, a WIFI module or an infrared module.

The wireless receiving module may include a wireless receiving antenna (not shown in the figures) and a chip 8. When the chip 8 is in a power supply state, it may realize wireless signal connection with an external audio transmission terminal, and may transmit data with the audio transmission terminal through the wireless receiving antenna, thereby receiving the audio signal and transmitting the audio signal to the signal processing module. For example, if the wireless receiving module is a Bluetooth module, the wireless receiving antenna may be a Bluetooth transmitter, and the chip 8 may be a Bluetooth chip.

In a preferred embodiment, the operation frequency of the wireless receiving module may be set to about 2 GHz, the operation frequency of the wireless charging unit may be 100 KHz~300 KHz, and the frequency of the audio signal may be 10 Hz~10 KHz, so that wireless reception, wireless charging and audio signal in the present invention have different frequency ranges, and the operations of the different components will not affect each other. As such, normal vibration and sound of the vibration diaphragm 1 are ensured.

The signal processing module is connected to the wireless receiving module, and can receive the audio signal transmitted from the wireless receiving module and convert the audio signal into a corresponding audio current. The signal processing module may be further electrically connected to the voice coil 2 to transmit the processed audio current to the voice coil 2.

In a preferred embodiment, the vibration diaphragm 1 may be provided with a printed circuit board 4 on one side thereof where the voice coil 2 is fixed, and the signal processing module is provided on the printed circuit board 4.

The signal processing module may include a conversion circuit formed by components such as an operational amplifier and a digital-to-analog converter provided on the printed circuit board 4, where the audio signal transmitted from the wireless receiving module is converted into the audio current via the conversion circuit.

Preferably, when the wireless receiving module includes a wireless receiving antenna and a chip 8, the wireless receiving antenna may be integrated on the chip 8, or may be arranged on the printed circuit board 4. The chip 8 may also be fixed on the printed circuit board 4 and connected to the signal processing module through metal wirings on the circuit board.

Further, the printed circuit board 4 may be provided with two pads 5 electrically connected to the signal processing module through a first wire 6. The voice coil 2 typically includes two voice coil leads 3 for connecting with an external circuit. The two voice coil leads 3 of the coil 2 and the two pads 5 are respectively welded and connected, so as to realize the electrical connection between the signal processing module and the voice coil 2, forming a loop with the voice coil 2. The signal processing module may input the processed audio current into voice coil 2 through voice coil leads 3. In a practical application, the pads 5 may also be arranged on the surface of the vibration diaphragm, as long as the pads can be electrically connected to the voice coil leads.

In an alternative embodiment, the vibration diaphragm includes a vibration diaphragm central portion, a corrugated rim portion outside the vibration diaphragm central portion, and a connection portion outside the corrugated rim portion; wherein, the connection portion may be fixed to the external structure to fix the vibration diaphragm 1 on the external structure.

In an alternative embodiment, the printed circuit board 4 is fixed on a side surface of the vibration diaphragm central portion close to the voice coil 2. The printed circuit board 4 is on the same side as the voice coil 2, which can shorten the distance between the voice coil leads 3 and the pads 5 on the printed circuit board 4, thereby reducing the length of the voice coil leads 3, avoiding the risk caused by the length of the voice coil leads 3 that the voice coil 2 collision with the vibration diaphragm 1 and introducing noise, and further preventing the voice coil leads 3 from breaking. Meanwhile, the printed circuit board 4 may also be used as a reinforcing layer of the vibration diaphragm 1, to improve the high frequency performance of the vibration diaphragm 1.

Preferably, the size of the printed circuit board 4 can be increased as appropriate. As in this embodiment, an edge of the printed circuit board 4 extends to the outer edge of the vibration diaphragm central portion, so that the voice coil 2 may be fixed on the printed circuit board 4. Two pads 5 are respectively arranged close to the two voice coil leads 3, to further reduce the length of the voice coil leads 3. It is even possible that the voice coil leads 3 are led out against the surface of the pads 5 and fixed with the pads 5, so that the voice coil leads 3 has no suspension part, thus fundamentally solving the problem that the voice coil leads 3 being prone to rub against the vibration diaphragm 1 when the voice coil 2 vibrates and introduce noise.

The printed circuit board 4 may be used as a reinforcing layer of the vibration diaphragm 1, so that a center of the vibration diaphragm central portion may be hollowed out, which reduces weight of the vibration diaphragm 1 and improves performance of the vibration diaphragm 1 in the entire frequency band. The hollowed-out edge needs to be located on an inner side of the edge of the printed circuit board 4 to ensure airtightness of the vibration diaphragm 1.

In another alternative embodiment, the printed circuit board 4 is fixed on a surface of one side of the vibration diaphragm central portion close to the voice coil 2, and another side of the vibration diaphragm central portion away from the voice coil 2 may still be provided with a reinforcing portion for vibration diaphragm 1. As such, the center of the vibration diaphragm central portion may also be hollowed out, and the printed circuit board 4 may be fixed on the vibration diaphragm central portion or the vibration diaphragm 1 reinforcing portion. The printed circuit board 4 forms a sealed structure together with the vibration diaphragm central portion and the vibration diaphragm 1 reinforcing portion.

When the printed circuit board 4 is fixed on the vibration diaphragm central portion, the hollowed-out edge needs to be located on an inner side of the edge of the printed circuit board 4. When the printed circuit board 4 is fixed on the vibration diaphragm 1 reinforcing portion, the hollowed-out edge needs to be located on an inner side of the edge of the vibration diaphragm 1 reinforcing portion, so as to ensure the sealing performance of the vibration diaphragm 1.

In another alternative embodiment, the vibration diaphragm 1 reinforcing portion is provided on a side of the vibration diaphragm central portion close to the voice coil 2. The printed circuit board 4 may be fixed on the vibration diaphragm 1 reinforcing portion. As such, the center of the vibration diaphragm central portion may also be hollowed out. The hollowed-out edge needs to be located on an inner side of the edge of the vibration diaphragm 1 reinforcing portion, so as to ensure the sealing performance of the vibration diaphragm 1.

In a preferred embodiment, the wireless charging unit may include a first coil 7 provided on the side of vibration diaphragm 1 where the voice coil 2 is fixed. The first coil 7 may generate electric energy in a varying magnetic field generated by an external power supply and transmit the electric energy to the wireless transmission unit, so as to provide the electric energy for the wireless transmission unit. The external power supply may include an external coil arranged in correspondence with the first coil 7, and the external coil is connected to the power supply. The power supply inputs a varying current to the external coil, and the external coil may generate a varying magnetic field. According to the principle of electromagnetic induction, the first coil 7 located in the varying magnetic field may generate electric current, thereby providing electric energy for the wireless transmission unit.

In this embodiment, the first coil 7 may be arranged on the printed circuit board 4, and is electrically connected to the wireless transmission unit through the second wire 9 on the printed circuit board 4. In other embodiments, the first coil 7 may also be fixed on the vibration diaphragm 1 and electrically connected to the wireless transmission unit by forming a metal plating layer on the vibration diaphragm 1 or the like.

In one embodiment, when the printed circuit board 4 is fixed on a side of the vibration diaphragm 1 close to the voice coil 2, a groove may be formed on the vibration diaphragm 1, so that the printed circuit board 4 may be arranged in the groove. Preferably, an outer surface of the printed circuit board 4 may be flush with a surface of the vibration diaphragm 1, so as not to increase the volume of the vibration diaphragm 1 and prevent collision with the magnetic circuit system of the sound generator during the vibration.

In another embodiment, in order to guarantee vibration performance of the vibration diaphragm 1, the vibration diaphragm 1 needs to have a certain thickness and structural size. When the printed circuit board 4 is fixed on a side of the vibration diaphragm 1 close to the voice coil, the printed circuit board 4 or the chip 8 fixed on a surface thereof may have a height higher than that of the surface of the vibration diaphragm 1. As such, an evasion groove for avoiding the printed circuit board 4 can be formed on the central magnet in a center of the magnetic circuit system of the sound generator, or the center of the central magnet can be hollowed out to evade from the chip 8. Thereby, the problem of space occupation caused by the arrangement of the printed circuit board 4 or the chip 8 is solved, improving the overall sensitivity of the sound generator and preventing introduction of noise.

According to another aspect of the present invention, the embodiment also discloses a vibration assembly including the above-mentioned vibration diaphragm 1 and a voice coil 2 fixed to the vibration diaphragm 1, wherein the voice coil 2 may be fixed on the vibration diaphragm 1 or the printed circuit board 4 by applying glue or the like.

According to still another aspect of the present invention, this embodiment also discloses a sound generator. The sound generator includes a sound generator shell, and the vibration assembly according to this embodiment received in the sound generator shell. The sound generator may further include a magnetic circuit assembly, which may include a magnetic conductive yoke, at least one magnet fixed on the magnetic conductive yoke, and magnetic conductive plates fixed on each magnet, wherein at least one magnet may be configured as a central magnet located in the center of the magnetic yoke; alternatively, a three-magnetic circuit structure including three magnets is formed by arranging one side magnet on each of a pair of opposite sides of a central magnet; alternatively, a five-magnetic circuit structure including five magnets is formed by arranging one side magnet on each of two pairs of opposite sides of the central magnet, in order to enhance the magnetic field strength. In order to reduce magnetic leakage, on an outer side of at least one magnet, an edge of the magnetic yoke can be bent toward the magnet, or an additional magnetic conductive sheet may be provided. The central magnet and the side magnets, magnetic yoke or magnetic conductive sheet may form a magnetic gap for accommodating the voice coil 2. Upon the audio current being input into the voice coil 2, the voice coil 2 vibrates under the action of the magnetic gap magnetic field, and drives the vibration diaphragm 1 to vibrate and generate sound.

The sound generator shell may include a housing and a front cover. The external power supply module for charging the wireless charging unit may include a second coil fixed on a surface of the front cover in correspondence with the vibration diaphragm 1, and a power supply connected to the second coil. The second coil generates a varying magnetic field under the action of the power supply, and the first coil 7 generates electric energy under the action of the varying magnetic field. The power supply may be arranged outside the sound generator and connected to the second coil arranged in the sound generator through the wires, or a conductive sheet is injection molded on the front cover to realize electrical connection between the second coil and the external power supply.

According to another aspect of the present invention, this embodiment also discloses a sound generator module, which includes a module housing and the sound generator as described in this embodiment fixed in the module housing. The sound generator module divides a cavity formed by the module housing into a front acoustic cavity and a rear acoustic cavity, wherein the front acoustic cavity corresponds to the front of the vibration diaphragm 1.

In an alternative embodiment, the external power supply module for charging the wireless charging unit may include a third coil fixed in the front acoustic cavity or the rear acoustic cavity, and a power supply connected to the third coil. The position of the third coil corresponds to the first coil 7. The third coil generates a varying magnetic field under the action of the power supply, and the first coil 7 generates electric energy under the action of the varying magnetic field. The power supply may be fixed outside the sound generator module and connected to the third coil through the wires, or a conductive sheet may be injection molded on the module housing to realize electrical connection between the third coil and the external power supply.

Apparently, the above-mentioned embodiments of the present invention are merely examples for clearly describing the present invention, and are not intended to limit the implementations of the present invention. Based on the foregoing description, other different modifications or alternations may conic to those of ordinary skill in the art. It is not possible to be exhaustive on all the implementations herein. Any obvious changes derived from the technical solutions of the present invention shall still fall within the protection scope of the present invention.

The invention claimed is:

1. A vibration diaphragm having a first side adapted for fixing a voice coil, comprising:

a wireless transmission unit arranged on the first side of the vibration diaphragm, and adapted for electrically connecting to the voice coil, wirelessly receiving an audio signal transmitted from an external terminal and processing the audio signal to obtain an audio current, and inputting the audio current into the voice coil; and a wireless charging unit electrically connected to the wireless transmission unit, adapted for generating electric energy under an action of an external power supply module and inputting the electric energy into the wireless transmission unit, the wireless transmission unit comprises a wireless receiver and a signal processor;

the wireless receiver is adapted for wireless connection to the external terminal, receiving the audio signal transmitted from the external terminal and transmitting the audio signal to the signal processor;

the signal processor is adapted to receive the audio signal, convert the audio signal into the audio current, and input the audio current into the voice coil;

the first side of the vibration diaphragm further comprises a printed circuit board, and wherein the signal processor is provided on the printed circuit board;

the vibration diaphragm comprises a vibration diaphragm central portion, a corrugated rim portion outside the vibration diaphragm central portion, and a connection portion outside the corrugated rim portion;

an edge of the printed circuit board extends to the outer edge of the vibration diaphragm central portion;

the printed circuit board is provided with two pads electrically connected to the signal processor;

the voice coil comprises two voice coil leads, and the two pads are adapted to be welded to first and second voice coil leads of the voice coil, respectively, wherein the voice coil leads are led out against the surface of the pads and fixed with the pads.

2. The vibration diaphragm according to claim 1, wherein an operation frequency of the wireless charging unit is in the range of 100 kHz~300 kHz, and a frequency of the audio signal is in the range of 10 Hz~10 kHz.

3. The vibration diaphragm according to claim 1, wherein the wireless charging unit comprises a first coil connected to the wireless transmission unit;

the first coil generates electric energy under an action of a varying magnetic field generated by the external power supply module and transmits the electric energy to the wireless transmission unit; and the first coil is provided on one of the vibration diaphragm, the printed circuit board, or the voice coil fixed to the vibration diaphragm.

4. A vibration assembly, comprising a vibration diaphragm according to claim 1, and a voice coil fixed to the vibration diaphragm.

5. A sound generator, comprising a sound generator shell and a vibration assembly according to claim 4 received in the sound generator shell.

6. The sound generator according to claim 5, wherein the sound generator shell comprises a housing and a front cover;

a second coil electrically connected to an external power supply is fixed on an inner surface of the front cover corresponding to the vibration diaphragm; and the external power supply module comprises the second coil and the external power supply, the second coil generates a varying magnetic field under an action of the external power supply, and a first coil generates electrical energy under an action of the varying magnetic field.

7. A sound generator module, comprising a module housing and a sound generator according to claim 5 fixed in the module housing.

8. The sound generator module according to claim 7, wherein a third coil electrically connected to an external power supply is fixed in the module housing; and the external power supply module comprises the third coil and the external power supply, the third coil generates a varying magnetic field under an action of the external power supply, and the first coil generates electric energy under an action of the varying magnetic field.

* * * * *